(12) United States Patent
Blank et al.

(10) Patent No.: US 9,149,985 B2
(45) Date of Patent: Oct. 6, 2015

(54) REINFORCING SYSTEM FOR REINFORCING A CAVITY OF A STRUCTURAL ELEMENT

(75) Inventors: Norman Blank, Rüschlikon (CH); Jürgen Finter, Zürich (CH); Vincent Belpaire, Brussels (BE)

(73) Assignee: SIKA TECHNOLOGY AG, Baar (CH)

( * ) Notice: Subject to any disclaimer, the term of this patent is extended or adjusted under 35 U.S.C. 154(b) by 865 days.

(21) Appl. No.: 12/448,494

(22) PCT Filed: Dec. 21, 2007

(86) PCT No.: PCT/EP2007/064464
§ 371 (c)(1),
(2), (4) Date: Oct. 26, 2009

(87) PCT Pub. No.: WO2008/077944
PCT Pub. Date: Jul. 3, 2008

(65) Prior Publication Data
US 2010/0092733 A1    Apr. 15, 2010

(30) Foreign Application Priority Data
Dec. 22, 2006   (EP) ..................... 06127083

(51) Int. Cl.
*B29C 65/54*    (2006.01)
*B29C 65/00*    (2006.01)
(Continued)

(52) U.S. Cl.
CPC ............... *B29C 66/742* (2013.01); *B29C 65/54* (2013.01); *B29C 66/545* (2013.01); *B62D 29/002* (2013.01); *C09J 133/08* (2013.01);
(Continued)

(58) Field of Classification Search
CPC .. Y10T 156/10; B29C 65/54; B29C 65/4865; B29C 65/485; B29C 65/483; B29C 65/542; B29C 65/545; B29C 66/727; B29C 65/65
USPC ........... 156/145, 294, 605, 325; 264/259, 261
See application file for complete search history.

(56) References Cited

U.S. PATENT DOCUMENTS 3,890,407 A    6/1975 Briggs, Jr. et al.
4,106,971 A    8/1978 Briggs, Jr. et al.
(Continued)

FOREIGN PATENT DOCUMENTS

CN    1620362 A    5/2005
DE    199 04 630 A1    8/2000
(Continued)

OTHER PUBLICATIONS

Office Action issued in Chinese Patent Application No. 200780050782.8 dated Jul. 20, 2010.
(Continued)

*Primary Examiner* — Donald J Loney
(74) *Attorney, Agent, or Firm* — Oliff PLC (57) ABSTRACT

In the case of a reinforcing system for reinforcing a cavity of a structural element, a carrier element is connected to the structural element in the structural element for reinforcement purposes. The carrier element has channels, an adhesive is disposed in the cavity between the carrier element and the structural element, and the adhesive can be introduced into the cavity between the carrier element and the structural element by means of the channels.

14 Claims, 5 Drawing Sheets

(51) Int. Cl.

| | |
|---|---|
| *B62D 29/00* | (2006.01) |
| *C09J 133/08* | (2006.01) |
| *C09J 133/10* | (2006.01) |
| *C09J 163/00* | (2006.01) |
| *C09J 175/04* | (2006.01) |
| *B29K 75/00* | (2006.01) |
| *B29K 77/00* | (2006.01) |
| *B29K 105/04* | (2006.01) |
| *B29K 305/00* | (2006.01) |
| *B29L 31/30* | (2006.01) |
| *B29L 31/60* | (2006.01) |
| *C08L 33/08* | (2006.01) |
| *C08L 33/10* | (2006.01) |
| *B29C 65/48* | (2006.01) |

(52) U.S. Cl.
CPC ............. *C09J 133/10* (2013.01); *C09J 163/00* (2013.01); *C09J 175/04* (2013.01); *B29C 65/483* (2013.01); *B29C 65/485* (2013.01); *B29C 65/4865* (2013.01); *B29C 65/542* (2013.01); *B29C 66/71* (2013.01); *B29C 66/727* (2013.01); *B29K 2075/00* (2013.01); *B29K 2077/00* (2013.01); *B29K 2105/04* (2013.01); *B29K 2105/048* (2013.01); *B29K 2305/00* (2013.01); *B29L 2031/30* (2013.01); *B29L 2031/605* (2013.01); *C08L 33/08* (2013.01); *C08L 33/10* (2013.01); *Y10T 156/10* (2015.01); *Y10T 428/24628* (2015.01)

(56) References Cited

U.S. PATENT DOCUMENTS

| | | | |
|---|---|---|---|
| 4,263,419 | A | 4/1981 | Piestert et al. |
| 4,610,836 | A * | 9/1986 | Wycech .................. 264/313 |
| 5,266,133 | A | 11/1993 | Hanley et al. |
| 5,373,027 | A | 12/1994 | Hanley et al. |
| 6,159,414 | A * | 12/2000 | Tunis et al. ............. 264/510 |
| 6,272,809 | B1 * | 8/2001 | Wycech ................... 52/847 |
| 6,387,470 | B1 | 5/2002 | Chang et al. |
| 6,548,593 | B2 | 4/2003 | Merz et al. |
| 2003/0184121 | A1 * | 10/2003 | Czaplicki et al. ........ 296/187.02 |
| 2003/0201572 | A1 * | 10/2003 | Coon et al. ............... 264/263 |

FOREIGN PATENT DOCUMENTS

| | | |
|---|---|---|
| DE | 200 13 208 U1 | 11/2000 |
| DE | 101 48 770 A1 | 4/2003 |
| EP | 0 730 493 B1 | 8/2000 |
| EP | 1 152 019 A1 | 11/2001 |
| EP | 1 410 976 B1 | 1/2008 |
| JP | U-04-067190 | 6/1992 |
| JP | A-05-294258 | 11/1993 |
| WO | WO 02/070620 A1 | 9/2002 |
| WO | WO 03/061934 A1 | 7/2003 |

OTHER PUBLICATIONS

Mar. 11, 2011 Office Action issued in Russian Application No. 2009128183/11 (039157) (with English translation).
Nov. 22, 2011 Office Action issued in Japanese Application No. 2009-542099 (with English translation).
Jan. 13, 2014 Korean Office Action issued in Korean Application No. 10-2009-7015301 with English-language translation.

\* cited by examiner

REINFORCING SYSTEM FOR REINFORCING A CAVITY OF A STRUCTURAL ELEMENT

FIELD OF THE INVENTION

The invention is based on a reinforcing system for reinforcing a cavity of a structural element in accordance with preamble clause of the first claim.

The invention is likewise based on a method of reinforcing a cavity of a structural element in accordance with preamble clause of the independent method claim.

DESCRIPTION OF THE PRIOR ART

Structural elements frequently have cavities, particularly in order to permit lightweight constructions. These cavities, however, give rise to a wide variety of problems. Depending on the nature of the cavity, it has to be sealed off in order to prevent penetration of moisture and dirt that can lead to the corrosion of the structural elements. Often it is also desirable to provide the cavities and hence the structural element with substantial reinforcement, but while retaining the light weight. Often it is also necessary to stabilize the cavities and hence the structural elements in order to reduce noise, which would otherwise be transmitted along or through the cavity. Many of these cavities have an irregular shape or narrow dimensions, thereby making it more difficult to provide them with correct sealing, reinforcement, and damping.

Particularly in order to enhance the mechanical characteristics of vehicle structures, also referred to below as bodywork, such as, for example, the crash performance, the stiffness, improved vibration damping, and so on, it is known to install local reinforcing structures into the vehicle structure. These local reinforcing structures consist, for example, of metal such as aluminum or steel, plastic, structural foams or combinations of these materials. These reinforcing structures are positioned in the vehicle structure and connected to it. Metallic reinforcing structures can be connected to the vehicle structure by means, for example, of welding, but this is not always possible and does not always allow effective reinforcement. Connecting by means of a structural foam as well does not always produce the desired results. A first reason for this is that the layer of structural foam is relatively thick, and a second is that the mechanical properties of these structural foams are moderate, particularly in relation to the shear strength, the adhesion, and the unsatisfactory behavior at high temperatures.

SUMMARY OF THE INVENTION

The invention is based on the object of avoiding the disadvantages of the prior art in a reinforcing system of the type specified at the outset, and of providing an improved reinforcing system.

In accordance with the invention this is achieved through the features of the first claim.

The core of the invention, therefore, is that the carrier element has channels, that an adhesive is disposed in the cavity between the carrier element and the structural element, and that the adhesive can be introduced into the cavity between the carrier element and the structural element by means of the channels.

The advantages of the invention are to be seen in the facts, among others, that the subsequently injected adhesive can be adapted arbitrarily to the desired conditions in the process of producing the structural element. A reinforcing system of this kind therefore has much better properties than existing systems with foamable materials. Thus, for example, the desired mechanical properties can be selected specifically, something which is only a limited possibility in the case of foamable materials. In addition, the properties at high temperatures can be set much more effectively with a subsequently injected adhesive. Moreover, there are no ageing problems and there is no loss of properties in the course of transit, storage or installation. Moreover, the system shown here is outstandingly suitable for repair solutions which, additionally, have the same properties as the originally installed parts. Furthermore, it is also possible for an existing carrier element to have adhesive introduced subsequently, which means that parts which possibly are not holding properly can be fixed anew.

Further advantageous embodiments of the invention are apparent from the dependent claims.

BRIEF DESCRIPTION OF THE DRAWING

Working examples of the invention are elucidated in more detail below with reference to the drawings. Equal or equivalent elements in the various figures are given the same reference symbols. The direction of flow of the media is indicated by arrows.

Only those elements that are essential for the immediate understanding of the invention have been shown.

DESCRIPTION OF THE PREFERRED EMBODIMENT

Figure 1:
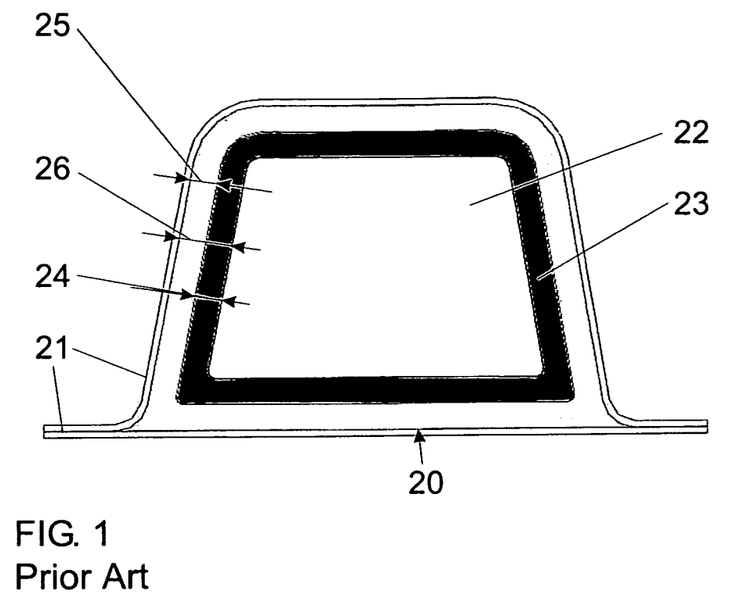
FIG. 1 shows a cross section through a prior-art reinforcing element.

FIG. 1 shows a known reinforcing element 20. It is disposed in a cavity of a body 21 of a vehicle, in this case a column of the bodywork. It is self-evident that a reinforcing element of this kind may be disposed in any cavity of the bodywork. The reinforcing element 20 comprises a carrier element 22 and a part 23 comprising a foamable material. Foamable materials of this kind foam preferably under the influence of heat. A preferred thermally foamable material is sold, for example, under the brand name SikaBaffle® 240, or 250 or 255, and is described in U.S. Pat. Nos. 5,266,133 and 5,373,027, whose disclosure is hereby incorporated. Alternatively, the thermally expanding material may also have reinforcing properties; material of this kind is sold, for example, under the brand name SikaReinforcer® 941, and is described in U.S. Pat. No. 6,387,470, whose disclosure is hereby incorporated. It is of course also possible to use other foamable materials, which may possibly be activated by external heat sources or internal heat sources, such as by an exothermic reaction, for example. The reinforcing element 20 is fixed in the cavity of the bodywork, typically by means of a fixing element, but may also be fixed in other ways. The carrier element 22 is composed typically of polyamide, but may also be made of other materials or material components, including, more particularly, of metal.

In its unfoamed state the foamable material has a thickness 24 and a distance 25 from the bodywork. This distance 25 is necessary to allow the bodywork to be coated in the deposition bath and in order to have sufficient tolerance for the installation of the reinforcing part 20. After foaming has taken place, the foamed material fills out the entire cavity and at this point has a thickness 26 which corresponds to the thickness 24 of the unfoamed material plus the distance from the bodywork; the thickness 26 is typically approximately 6 to 10 mm. This relatively high thickness 26 and the structural foam give rise, to the disadvantages of the systems used to date.

Figure 2A:
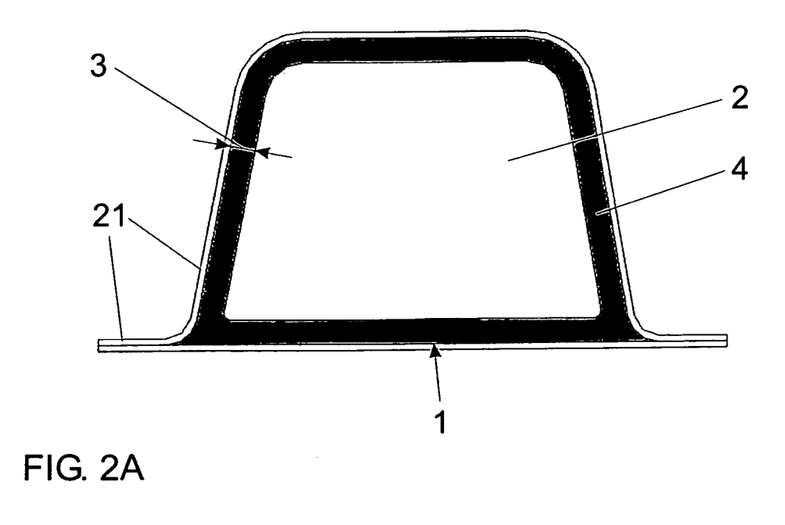
FIG. 2A shows a cross section through an inventive reinforcing element.
Figure 2B:
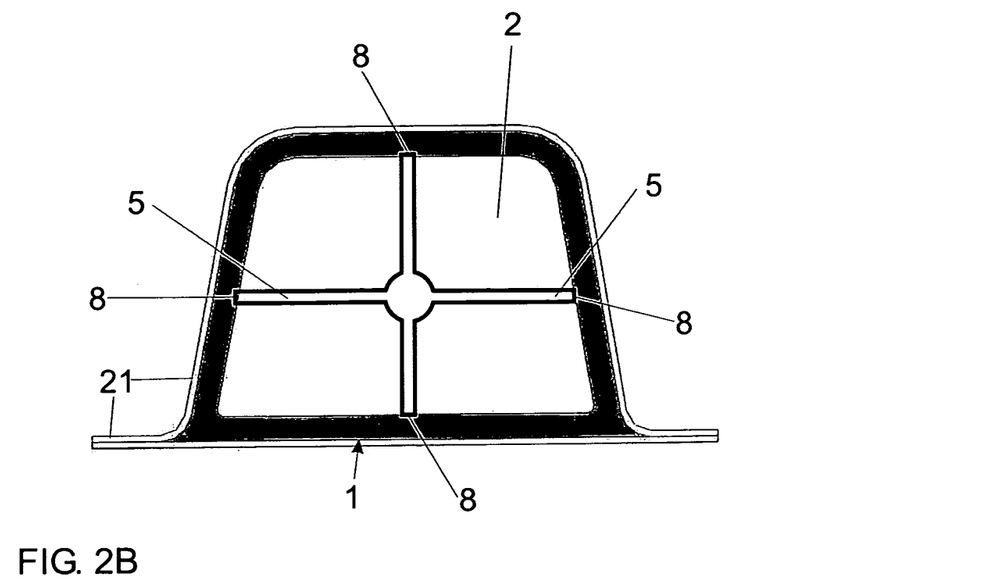
FIG. 2B shows a cross section through a further inventive reinforcing element.
Figure 2C:
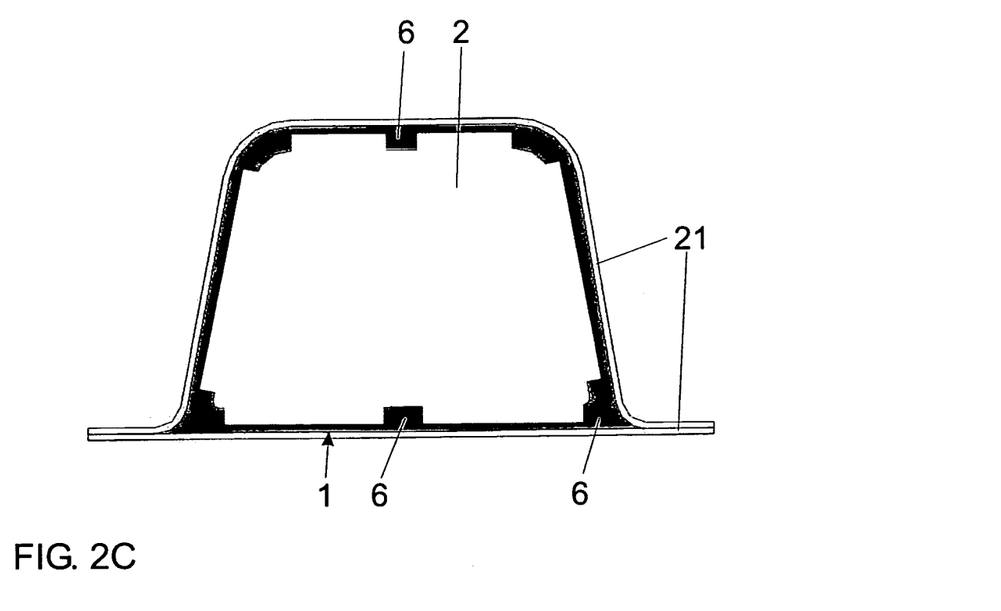
FIG. 2C shows a cross section through a further inventive reinforcing element.

FIGS. 2A, 2B, and 2C now show inventive reinforcing elements 1. Each reinforcing element 1 comprises a carrier element 2. The distance 3 between carrier element 2 and bodywork 21 is much lower here in comparison to the distance 26 from FIG. 1. The distance 3 can in this case be reduced to the distance necessary in order to allow the bodywork to be coated in the deposition bath and to have sufficient tolerance for the installation of the reinforcing part 1; typically this is about 3 to 5 mm. Since it is possible through the carrier element to dispose channels for coating in the deposition bath, the distance 3 can in fact be reduced still further to the tolerance that is needed for installation, increased by 1 to 2 mm as needed for the binding material, hence allowing the overall distance to be reduced to approximately 2 to 4 mm.

The carrier element 2 is then connected to the bodywork with an adhesive 4. This adhesive 4 is injected subsequently after the carrier element 2 has been installed, and for this purpose the carrier element may have special internal channels 5, e.g., tubular, or external channels 6, or—not shown—a combination of internal and external channels. The subsequently injected, adhesive may be adapted to the desired conditions and therefore has much better properties than existing foamable materials. Thus, for example, the desired mechanical properties can be selected specifically, something which is only of limited possibility in the case of foamable materials. In addition, the properties at high temperatures can be set very much more effectively with a subsequently injected adhesive. Moreover, there are no ageing problems and there is no loss of properties in the course of transit, storage or installation. Moreover, the system shown here is outstandingly suitable for repair solutions which, additionally, have the same properties as the originally installed parts. In the case of an existing carrier element, moreover, it is also possible for adhesive to be introduced subsequently, and so parts which possibly are not holding correctly can be fixed anew.

The carrier element may be made of any desired materials, as for example of a plastic such as polyurethane foam, which may be reinforced with fibers or beads, of polyamide, etc., or of metal such as aluminum, foamed aluminum, steel, etc., or a combination of these materials.

There are a very wide variety of systems that can be employed for the reactive adhesive. An essential point of the present invention, however, is that the reactive adhesive, in accordance with the temperatures which occur subsequently in the operation, can be selected such that sufficiently quick curing takes place to give the desired mechanical properties. If, for example, the part passes through a standard paint drying oven at temperatures of 165-180° C. for about 30 minutes, then typical structural 1K [one-component] epoxide-based structural adhesives can be used. In the case of lower curing temperatures it is preferred to use two-component systems. Through the present invention it is possible in each case to select adhesives which correspond precisely to the conditions desired by the manufacturer. If, for example, the manufacturer wishes to install the reinforcing parts at room temperature, this is possible with no problems. It is also possible to adapt the nature of the adhesive immediately to altered on-site production conditions without changing the carrier element. If, for example, the reinforcing part is now to be installed at higher temperatures, in order, for example, to simplify the production operation, an adhesive is simply used which cures at the corresponding temperature.

Table 1 compares typical data for a conventionally used foam with those of an adhesive for use in accordance with the invention. These data represent only preferred ranges and it is of course also possible to use adhesives having other properties. The adhesives to be used in accordance with the invention may of course also be filled, as for example with reinforcing materials such as fibers. In order to prevent contraction and stresses on curing, the adhesive of the invention preferably has a volume expansion of 0 to 10%, more particularly 0 to 5%.

TABLE 1

|  | Conventional foam | Adhesive of the invention |
| --- | --- | --- |
| Expansion | 40%-200% | 0-5% |
| Compression modulus | 200-750 MPa | 1000-4000 MPa |
| Max compressive stress | 5-20 MPa | — |
| Tension modulus | 400-1500 MPa | 1000-4000 MPa |
| Max tensile stress | 2-10 Mpa | 20-50 MPa |
| Max shear stress | 2-8 Mpa | 15-30 MPa |

Shown below are reactive adhesives which can be used for the invention. It is of course also possible for other adhesives to be employed, if they have the requisite properties.

Examples of Reactive Adhesives: One-component Systems

A one-component reactive adhesive which can be used for the invention is a storage-stable polymer composition which is characterized in that it comprises at least one resin A that enters into polymerization reactions, at least one curing agent B, more particularly a blocked curing agent, at least one additive D, and also, optionally, further components, with preferably at least one of the components A or B being present in a blocked form.

In a first embodiment the one-component reactive adhesive is a polyurethane composition. It is characterized in that it comprises a polyurethane polymer containing free or blocked isocyanate groups as the resin A that enters into polymerization reactions. The term "polymer" refers in the present document on the one hand to a collective of macromolecules which, while being chemically uniform, nevertheless differ in respect of degree of polymerization, molar mass, and chain length, and that has been prepared by means of a polymerization reaction (addition polymerization, polyaddition or polycondensation). On the other hand the term "polymer" in this document also encompasses derivatives of such a collective of macromolecules from polymerization reactions—in other words, compounds which have been obtained by reactions, such as additions or substitutions, for example, of functional groups on existing macromolecules, and which may be chemically uniform or chemically nonuniform.

The term "polymer composition" refers in the present document to a homogeneous or heterogeneous mixture of substances which is composed of one or more polymers or which comprises polymers to a substantial degree.

The term "polyurethane" in the present document encompasses all polymers which are prepared by the diisocyanate polyaddition process. This also includes those polymers which are virtually or entirely free from urethane groups, such as polyether-polyurethanes, polyester-polyurethanes, polyether-polyureas, polyureas, polyester-polyureas, polyisocyanurates, polycarbodiimides, etc.

The prefix "poly" in substance names such as "polyol", "polyisocyanate" or "polyamine" refers in the present document to the fact that the substance in question contains formally more than one per molecule of the functional group that occurs in its name.

The polyurethane polymer containing isocyanate groups is prepared by reacting at least one polyol with at least one polyisocyanate. This reaction may be accomplished by reacting the polyol and the polyisocyanate by typical methods, as for example at temperatures of 50° C. to 100° C., where appropriate with accompanying use of suitable catalysts, the polyisocyanate being metered in such a way that its isocyanate groups are present in a stoichiometric excess in relation to the hydroxyl groups of the polyol. The excess of polyisocyanate is selected such that in the resulting polyurethane polymer, after the reaction of all of the hydroxyl groups of the polyol, there remains, for example, a free isocyanate group content of 0.1% to 15% by weight, preferably 0.5% to 5% by weight, based on the overall polyurethane polymer. Where appropriate the polyurethane polymer can be prepared with the accompanying use of plasticizers, in which case the plasticizers used contain no isocyanate-reactive groups.

As polyols for preparing a polyurethane polymer of this kind containing isocyanate groups it is possible to make use for example of the following commercial polyols or any desired mixtures thereof:

Polyoxyalkylene polyols, also called polyether polyols, which are polymerization products of ethylene oxide, 1,2-propylene oxide, 1,2- or 2,3-butylene oxide, tetrahydrofuran or mixtures thereof, optionally polymerized by means of a starter molecule having two or more active hydrogen atoms such as, for example, water, ammonia or compounds having two or more OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the aforementioned compounds. Use may be made not only of polyoxyalkylene polyols which have a low degree of unsaturation (measured in accordance with ASTM D-2849-69 and expressed in milliequivalents of unsaturation per gram of polyol (meq/g)), prepared for example with the aid of what are known as double metal cyanide complex catalysts (DMC catalysts), but also of polyoxyalkylene polyols having a high degree of unsaturation, prepared for example with the aid of anionic catalysts such as NaOH, KOH or alkali metal alkoxides.

Particular suitability is possessed by polyoxyalkylene diols or polyoxyalkylene triols, especially polyoxypropylene diols or polyoxypropylene triols.

Especially suitable are polyoxyalkylene diols or polyoxyalkylene triols having a degree of unsaturation of less than 0.02 meq/g and having a molecular weight in the range from 1000 to 30 000 g/mol, and also polyoxypropylene diols and triols having a molecular weight of 400 to 8000 g/mol. By "molecular weight" or "molar weight" is always meant in the present document the molecular weight average $M_n$.

Likewise particularly suitable are what are called "EO-endcapped" (ethylene oxide-endcapped) polyoxypropylene diols or triols. The latter are special polyoxypropylene-polyoxyethylene polyols which are obtained, for example, by alkoxylating pure polyoxypropylene polyols with ethylene oxide after the end of the polypropoxylation, and which consequently contain primary hydroxyl groups.

Styrene-acrylonitrile-grafted polyether polyols, of the kind supplied, for example, by Bayer under the name Lupranol.

Polyester polyols prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the aforementioned alcohols with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid and hexahydrophthalic acid or mixtures of the aforementioned acids, and also polyester polyols from lactones such as ϵ-caprolactone, for example.

Polycarbonate polyols of the kind obtainable by reaction, for example, of the abovementioned alcohols—those used to construct the polyester polyols—with dialkyl carbonates, diaryl carbonates or phosgene.

Polyacrylate and polymethacrylate polyols.

Polyhydroxy-terminated polybutadiene polyols, such as, for example, those prepared by polymerizing 1,3-butadiene and allyl alcohol.

Polyhydroxy-terminated acrylonitrile/polybutadiene copolymers, of the kind preparable, for example, from epoxides or amino alcohols and carboxyl-terminated acrylonitrile/polybutadiene copolymers (available commercially under the name Hycar® CTBN from Hanse Chemie). These stated polyols have an average molecular weight of 250 to 30 000 g/mol, more particularly of 1000 to 30 000 g/mol, and an average OH functionality in the range from 1.6 to 3.

Further to these stated polyols it is possible for low molecular mass dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols and other high-functionality alcohols, low molecular mass alkoxylation products of the aforementioned dihydric and polyhydric alcohols, and also mixtures of the aforementioned alcohols to be used accompanyingly when preparing the polyurethane polymer. Polyisocyanates used for preparing a polyurethane polymer of this kind containing isocyanate groups are commercial polyisocyanates. Examples include the following polyisocyanates which are very well known within polyurethane chemistry:

2,4- and 2,6-Tolylene diisocyanate (TDI) and any desired mixtures of these isomers, 4,4'-diphenylmethane diisocyanate (MDI), the positionally isomeric diphenylmethane diisocyanates, 1,3- and 1,4-phenylene diisocyanate, 2,3,5,6-tetramethyl-1,4-diisocyanatobenzene, 1,6-hexamethylene diisocyanate (HDI), 2-methylpentamethylene-1,5-diisocyanate, 2,2,4- and 2,4,4-trimethyl-1,6-hexamethylene diisocyanate (TMDI), 1,12-dodecamethylene diisocyanate, cyclohexane 1,3- and 1,4-diisocyanate and any desired mixtures of these isomers, 1-isocyanato-3,3,5-trimethyl-5-isocyanatomethylcyclohexane (isophorone diisocyanate or IPDI), perhydro-2,4'- and -4,4'-diphenylmethane diisocyanate (HMDI), 1,4-diisocyanato-2,2,6-trimethylcyclohexane (TMCDI), m- and p-xylylene diisocyanate (XDI), 1,3- and 1,4-tetramethylxylylene diisocyanate (TMXDI), 1,3- and 1,4-bis(isocyanatomethyl)cyclohexane, and also oligomers and polymers of the aforementioned isocyanates, and also any desired mixtures of the aforementioned isocyanates. Particular preference is given to MDI, TDI, HDI and IPDI, and also mixtures thereof. The most preferred are MDI and TDI and their mixtures.

In one preferred embodiment the polyurethane polymer containing isocyanate groups is blocked. This blocking is accomplished by the reaction of the polyurethane polymer containing isocyanate groups with a blocking agent. This reaction takes place preferably by adding the blocking agent to the polyurethane polymer containing isocyanate groups in a stoichiometric ratio, based on the isocyanate group content, and reacting this system at a temperature of 20 to 120° C. until there are virtually no free isocyanate groups detectable any longer. If desired it is possible to use a catalyst also, such as a tin compound or a bismuth compound, for example. Examples of suitable blocking agents are phenols such as phenol, cresol, xylenol, p-ethylphenol, o-isopropylphenol, p-tert-butylphenol, p-tert-octylphenol, nonylphenol, dodecylphenol, thymol, p-naphthol, p-nitrophenol, p-chlorophenol, 2-pyridinol; hydrocarbon resins containing phenol groups, such as cumarone-indene resins, petroleum resins, terpene resins; alcohols such as methanol, ethanol, propanol, isopropanol, butanol, 2-butanol, isobutanol, ethylene glycol, ethylene glycol methyl ether (Methyl-Cellosolve®), ethylene glycol butyl ether (Butyl-Cellosolve®), ethylene glycol phenyl ether (Phenyl-Cellosolve®), diethylene glycol monomethyl ether (Methyl-Carbitol®), diethylene glycol monobutyl ether (Butyl-Carbitol®), benzyl alcohol, furfuryl alcohol, cyclohexanol; 1,3-dicarbonyl compounds such as dimethyl malonate, diethyl malonate, diethyl methylmalonate, ethyl acetoacetate, 2,4-pentanedione; mercaptans such as butyl mercaptan, hexyl mercaptan, dodecyl mercaptan, thiophenol, 2-mercaptopyridine; carboxamides such as acetamide, acetanilide, acetaniside, benzamide; carboximides such as succinimide, maleimide; amines such as diisopropylamine, dicyclohexylamine, N-tert-butyl-N-benzylamine, 2,6-dimethylpiperidine, diphenylamine, phenylnaphthylamine, aniline, 9H-carbazole; nitrogen heterocycles such as imidazole, 2-methylimidazole, 2-ethylimidazole, benzimidazole, pyrazole, 3,5-dimethylpyrazole, 1,2,4-triazole, benzotriazole; ureas such as urea, thiourea, imidazolidin-2-one; aldoximes such as formaldoxime, acetaldoxime; ketoximes such as methyl ethyl ketoxime, methyl isopropyl ketoxime, methyl isobutyl ketoxime, methyl amyl ketoxime, diisopropyl ketoxime, cyclohexanone oxime; lactams such as ε-caprolactam, δ-valerolactam, γ-butyrolactam, β-propiolactam; imines such as ethyleneimine; N-hydroxysuccinimide; 2-benzoxazolone; 1,3-benzoazine-2,4-dione; bisulfites such as sodium bisulfite, potassium bisulfite; and further blocking agents, as set out in the two review articles by D. A. Wicks and Z. W. Wicks, Jr., "Blocked Isocyanates", which appeared in Progress in Organic Coatings 36 (1999), 148-172 and Progress in Organic Coatings 41 (2001), 1-83. Preferred blocking agents are phenols, hydrocarbon resins, alcohols, oximes, nitrogen heterocycles, 1,3-dicarbonyl compounds, amines, and lactams. Particularly preferred are methyl ethyl ketoxime, methyl isobutyl ketoxime, pyrazole, 3,5-dimethylpyrazole, 1,2,4-triazole, benzotriazole, dimethyl malonate, diethyl malonate, diisopropylamine, dicyclohexylamine, N-tert-butyl-N-benzylamine, and ε-caprolactam.

The polyurethane composition comprises as curing agent B a curing agent which comprises isocyanate-reactive groups and which is present in a blocked form, the blocking being possibly of chemical or physical nature. Examples of suitable chemically blocked curing agents are polyamines attached to metals via a complex bond, more particularly complex compounds of methylenedianiline (MDA) and sodium chloride. Complex compounds of this kind are typically described by the empirical formula $(MDA)_3.NaCl$. One suitable type is available as a dispersion in diethylhexyl phthalate under the trade name Caytur® 21 from Crompton Chemical. The complex decomposes on heating at 80-160° C. with a rate which increases as the temperature goes up, releasing methylenedianiline as the active curing agent. Examples of physically blocked curing agents are microencapsulated curing agents. Particularly suitable for use as curing agents in microencapsulated form are dihydric or polyhydric alcohols such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, low molecular mass alkoxylation products of the aforementioned dihydric and polyhydric alcohols; short-chain polyester polyols such as bisglycol terephthalate; aliphatic, cycloaliphatic, and aromatic amino alcohols such as ethanolamine, propanolamine, butanolamine, N-methylethanolamine, diethanolamine, triethanolamine; hydrazides of dicarboxylic acids; aliphatic polyamines such as ethylenediamine, 1,2- and 1,3-propanediamine, 2-methyl-1,2-propanediamine, 2,2-dimethyl-1,3-propanediamine, 1,3- and 1,4-butanediamine, 1,3- and 1,5-pentadiamine, 1,6-hexamethylenediamine, 2,2,4- and 2,4,4-trimethylhexamethylenediamine and mixtures thereof, 1,7-heptanediamine, 1,8-octanediamine, 4-aminomethyl-1,8-octanediamine, 1,9-nonanediamine, 1,10-decanediamine, 1,11-undecanediamine, 1,12-dodecanediamine, methylbis(3-aminopropyl)amine, 1,5-diamino-2-methylpentane (MPMD), 1,3-diaminopentane (DAMP), 2,5-dimethyl-1,6-hexamethylenediamine, dimer fatty acid diamines; cycloaliphatic polyamines such as 1,2-, 1,3- and 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, 1-amino-3-aminomethyl-3,5,5-trimethylcyclohexane (isophoronediamine or IPDA), 2- and 4-methyl-1,3-diaminocyclohexane and mixtures thereof, 1,3- and 1,4-bis(aminomethyl)cyclohexane, 1-cyclohexylamino-3-aminopropane, 2,5(2,6)-bis(aminomethyl)bicyclo[2.2.1]heptane (NBDA, produced by Mitsui Chemicals), 3(4),8(9)-bis(aminomethyl)tricyclo[$5.2.1.0^{2.6}$]decane, 1,4-diamino-2,2,6-trimethylcyclohexane (TMCDA), 3,9-bis(3-aminopropyl)-2,4,8,10-tetraoxaspiro[5.5]undecane, 1,3- and 1,4-xylylenediamine; aliphatic polyamines containing ether groups, such as bis(2-aminoethyl)ether, 4,7-dioxadecane-1,10-diamine, 4,9-dioxadodecane-1,12-diamine, and higher oligomers thereof, polyoxyalkylene-polyamines having theoretically two or three amino groups, available for example under the name Jeffamine® (produced by Huntsman Chemicals); aromatic polyamines such as methylenedianiline, diaminodiphenyl ether, diaminodiphenyl sulfone, the isomeric phenylenediamines, aminodiphenylamine. Preferred are the stated aliphatic, cycloaliphatic, and aromatic polyamines. The microencapsulation of these curing agents may be carried out according to one of the common methods, as for example by means of spray drying, interfacial polymerization, coacervation, immersion methods or centrifuge methods, fluidized-bed methods, vacuum encapsulation or electrostatic microencapsulation. The microcapsules thus obtained have a particle size of 0.1 to 100 micrometers, preferably 0.3 to 50 micrometers. The size of the microcapsules is made such that on the one hand they open effectively on heating and on the other hand the adhesive after curing has an optimum homogeneity and hence cohesive strength. They must not, furthermore, exert any harmful influence on the adhesion properties of the adhesive. Suitable material for the capsule shell includes polymers which are insoluble in the curing agent to be encapsulated and which have a melting point of 40 to 200° C. Examples of suitable polymers are hydrocarbon waxes, polyethylene waxes, wax esters, polyesters, polyamides, polyacrylates, polymethacrylates or mixtures of two or more such polymers.

In one preferred embodiment not only the polyurethane polymer containing isocyanate groups but also the curing agent are present in a blocked form in the polyurethane composition.

In a second embodiment the one-component reactive adhesive is a polyurethane composition comprising polyol and a blocked isocyanate curing agent dispersed therein. This composition is characterized in that it comprises, as resin A that enters into polymerization reactions, a polyol or a mixture of polyols, and comprises, as curing agent B containing isocyanate groups, an encapsulated isocyanate.

In a third embodiment the one-component reactive adhesive is an acrylate composition. This composition is characterized in that it comprises, as resin A that enters into polymerization reactions, at least one difunctional or polyfunctional monomer containing acrylic or methacrylic groups, and also at least one monofunctional monomer containing acrylic or methacrylic groups. Examples of suitable difunctional or polyfunctional monomers containing acrylic or methacrylic groups are acrylates and methacrylates of aliphatic polyether polyurethanes and polyester polyurethanes, polyethers, polyesters, novolaks, dihydric and polyhydric aliphatic, cycloaliphatic, and aromatic alcohols, glycols, and phenols. Examples of monofunctional monomers containing acrylic or methacrylic groups are methyl acrylate and methacrylate, ethyl acrylate and methacrylate, hexyl acrylate and methacrylate, dodecyl acrylate and methacrylate, tetrahydrofuryl acrylate and methacrylate, and also hydroxyl-containing acrylates and methacrylates such as 2-hydroxyethyl acrylate and methacrylate and 2-hydroxypropyl acrylate and methacrylate.

As curing agent B the acrylate composition comprises a thermal initiator which is present in a blocked form and which initiates the polymerization of the acrylate or methacrylate monomers. Examples of suitable thermal initiators are diacyl peroxides such as benzoyl peroxide, lauroyl peroxide, and decanoyl peroxide; peroxydicarbonates such as dipropyl peroxydicarbonate; peroxyoxalates such as di-tert-butyl peroxyoxalate; and hyponitrites such as di-tert-butyl hyponitrite. Benzoyl peroxide is preferred. The blocked thermal initiator, more particularly benzoyl peroxide, is preferably in a microencapsulated form. The preparation of microencapsulated organic peroxides is described in EP 0 730 493 B1, for example.

In a fourth embodiment the one-component reactive adhesive is an epoxide composition. This composition is characterized in that it comprises at least one polyepoxide as resin A that enters into polymerization reactions. Examples of suitable polyepoxides are diglycidyl ethers or polyglycidyl ethers of polyhydric aliphatic, cycloaliphatic or aromatic alcohols, polyalkylene glycols, phenols such as bisphenol A, or of condensation products of phenols with formaldehyde which are obtained under acidic conditions, such as phenol novolaks and cresol novolaks; polyglycidyl esters of polybasic carboxylic acids; and also N-glycidyl derivatives of amines, amides, and heterocyclic nitrogen bases. Glycidylized novolaks, hydantoins, aminophenols, bisphenols or aromatic diamines are preferred. Also present are adducts of liquid epoxy resins with reactive liquid rubbers.

As curing agent B the epoxide composition comprises a curing agent which contains epoxide-reactive groups and is present in a blocked form or in crystalline form as a compound of low solubility in epoxides. Examples of suitable curing agents are amines such as aliphatic, cycloaliphatic, aromatic or araliphatic, preferably primary or secondary, amines and polyamines; adducts and polyalkoxylation products of polyamines; amine-terminated polyalkylene glycols; adducts of monophenols or polyphenols with polyamides; polyamides, especially those deriving from aliphatic polyamines and dimerized or trimerized fatty acids; polysulfides; aniline-formaldehydes; polyhydric phenols; polybasic carboxylic acids and their anhydrides. Preferred curing agents are so-called latent curing agents such as dicyandiamides, urons, prepared by blocking isocyanates with amines, diurons, imidazoles, and combinations of these compounds with dicyandiamides.

The one-component reactive adhesive further comprises at least one additive D. Suitable additives include, for example, the following auxiliaries and adjuvants:

Plasticizers, examples being esters of organic carboxylic acids or their anhydrides, phthalates, such as dioctyl phthalate or diisodecyl phthalate, adipates, such as dioctyl adipate, sebacates, organic phosphoric and sulfonic esters, polybutenes, and other compounds that are nonreacting with isocyanates; reactive diluents and crosslinkers, examples being polyhydric alcohols, polyamines, polyaldimines, polyketimines or aliphatic isocyanates, such as 1,6-hexamethylene diisocyanate, 2,2,4- and 2,4,4-trimethyl-1,6-hexamethylene diisocyanate, 1,12-dodecamethylene diisocyanate, cyclohexane 1,3- and 1,4-diisocyanate, and any desired mixtures of these isomers, 1-isocyanato-3,3,5-trimethyl-5-isocyanatomethylcyclohexane (isophorone diisocyanate or IPDI), perhydro-2,4'- and -4,4'-diphenylmethane diisocyanate, 1,3- and 1,4-tetramethylxylylene diisocyanate, isocyanurates of these isocyanates, oligomers and polymers of these isocyanates, and also their adducts with polyols; organic and inorganic fillers, such as ground or precipitated calcium carbonates, which optionally are coated with stearates, especially finely divided coated calcium carbonate, carbon blacks, kaolins, aluminas, silicas, and PVC powders or hollow beads; fibers, of polyethylene, for example; pigments; catalysts for the reaction of the isocyanate groups, examples being organotin compounds such as dibutyl tin diacetate, dibutyl tin dilaurate, dioctyl tin dicarboxylate, dibutyl tin dichloride, dibutyl tin diacetylacetonate, alkyltin thioesters, organobismuth compounds or bismuth complexes, tertiary amines such as 2,2'-dimorpholinodiethyl ether, for example; polyaldimines, polyketimines or polyoxazolidines; catalysts for the hydrolysis of aldimine, ketimine, and oxazolidine groups, examples being organic carboxylic acids such as benzoic acid or salicylic acid, organic carboxylic anhydrides such as phthalic anhydride or hexahydrophthalic anhydride, silyl esters of organic carboxylic acids, organic sulfonic acids such as p-toluenesulfonic acid or 4-dodecylbenzenesulfonic acid, or other organic or inorganic acids, or mixtures of the aforementioned acids; catalysts for the reaction of the epoxide groups, such as, for example, salicylic acid, dicyandiamide, tertiary amines or quaternary ammonium compounds, Mannich bases, imidazoles, and also boron trifluoride or its complexes with organic compounds such as ethers and amines, where appropriate in blocked form; catalysts for accelerating the acrylate polymerization, examples being tertiary amines such as N,N-dimethylaniline, N,N-dimethyl-p-toluidine, N,N-dimethylbenzylamine, and N-alkylmorpholine, thioureas such as 1,3-diethylthiourea, or complexes or salts of nickel, cobalt, and copper, and also combinations of these catalysts; rheology modifiers such as, for example, thickeners or thixotropic agents, examples being urea compounds, polyamide waxes, bentonites or fumed silicas; adhesion promoters, more particularly silanes such as alkylsilanes, epoxyalkylsilanes, vinylsilanes, aldiminoalkylsilanes, methacryloyloxyalkylsilanes, and isocyanatoalkylsilanes, and also oligomeric forms of these silanes; waxes; driers, examples being p-tosyl isocyanate and other reactive isocyanates, orthoformic esters, calcium oxide or molecular sieves; stabilizers against heat, light, and UV radiation; flame retardants; surface-active substances, examples being wetting agents, flow control agents, deaerating agents or defoamers; fungicides or fungal growth inhibitor substances; and also further substances typically used in reactive adhesives. It is clear to a person skilled in the art which auxiliaries and adjuvants are suitable for the particular embodiment of the reactive adhesive.

One-component adhesives of this kind are easy to use. In view of the blocking of resin and/or curing agent, they are extremely stable on storage. In the preferred embodiments, given the blocking of resin A and/or curing agent B, they are not susceptible to moisture. They have good mechanical properties, and these properties can be adjusted within a wide range.

Examples of Reactive Adhesives: Two-component Systems

In the case of two-component systems it is necessary for one component to be stored separately from the other, and to be released in a targeted way on application. The reactive adhesive is composed in this case of a resin and a curing agent.

A viscosity <7000 mPa·s is necessary for thorough mixing of the components. The viscosity can be adjusted by an increase in temperature. This increase in temperature may occur as a result, for example, of introduction of microwaves or by induction; the absorption of energy may be improved by means of absorbing particles in the adhesive formulation, such as electrically conducting particles or nanoscale or microscale ferrites, as also described above in the examples of the one-component systems.

The storage-stable reactive adhesives present as separate components may be based, for example, on the following systems:

1) Epoxy Resins and Curing Agents

As epoxy resin it is possible here to use any desired epoxy resins; the epoxy resin preferably contains at least two epoxide groups in the molecule. Suitable epoxy resins are more particularly those having more than one epoxide group, β-methylglycidyl group or 2,3-epoxycyclopentyl group, which are attached to a heteroatom, such as sulfur, for example, but preferably to oxygen or nitrogen, more particularly bis(2,3-epoxycyclopentyl)ether, diglycidyl ethers or polyglycidyl ethers of polyhydric aliphatic or aromatic alcohols such as butane-1,4-diol, or polyalkylene glycols such as polypropylene glycol; diglycidyl ethers or polyglycidyl ethers of cycloaliphatic polyols such as 2,2-bis(4-hydroxycyclohexyl)propane; diglycidyl ethers or polyglycidyl ethers of polyhydric phenols such as resorcinol, bis(p-hydroxyphenyl) methane, 2,2-bis(p-hydroxyphenyl)propane (bisphenol A), 2,2-bis(4'-hydroxy-3',5'-dibromophenyl)propane, and 1,1,2, 2-tetrakis(p-hydroxyphenyl)ethane, or of condensation products of phenols with formaldehyde which are obtained under acidic conditions, such as phenol novolaks and cresol novolaks, and also the di(β-methylglycidyl)ethers or poly(β-methylglycidyl)ethers of the aforementioned polyhydric alcohols or phenols. Additionally suitable are polyglycidyl esters of polybasic carboxylic acids such as phthalic acid, terephthalic acid, tetrahydrophthalic acid, and hexahydrophthalic acid, the N-glycidyl derivatives of amines, amides, and heterocyclic nitrogen bases such as N,N-diglycidylaniline, N,N-diglycidyltoluidine, N,N,O-triglycidyl-p-aminophenol, N,N,N', N'-tetraglycidylbis(p-aminophenyl)methane, and triglycidyl isocyanurate.

Glycidylized novolaks, hydantoins, aminophenols, bisphenols or aromatic diamines are one preferred group of epoxy resins. Preferred compositions also comprise as resin a glycidylized cresol novolak, bisphenol A diglycidyl ether or a bisphenol A diglycidyl ether which has been advanced using, for example, bisphenol A, dimeric fatty acids or a mixture thereof, and also mixtures thereof with aliphatic diglycidyl ethers.

Possible epoxide curing agents are acidic or basic compounds. Examples of suitable curing agents are amines such as aliphatic, cycloaliphatic, aromatic or araliphatic, preferably primary or secondary, amines such as, for example, ethylenediamine, hexamethylenediamine, trimethylhexamethylenediamine, diethylenetriamine, triethylenetetramine, tetra-ethylenepentamine, N,N-dimethylpropylene-1,3-diamine, N,N-diethylpropylene-1,3-diamine, 2,2-bis(4'-aminocyclohexyl)propane, 3,5,5-trimethyl-3-(aminomethyl)cyclohexylamine (isophoronediamine), m-phenylenediamine, p-phenylenediamine, bis(4-aminophenyl)methane, bis(4-aminophenyl)sulfone, and m-xylylenediamine; adducts of polyalkylene-polyamines, such as diethylenetriamine or triethylenetetramine, with acrylonitrile or monoepoxides such as ethylene oxide or propylene oxide, for example; amine-terminated polyalkylene glycols, available for example under the name JEFFAMINE® (Huntsman); adducts of polyamines, such as diethylenetriamine or triethylenetetramine, with polyepoxides, such as bisphenol A diglycidyl ether, prepared with an excess of these polyamines; adducts of monophenols or polyphenols with polyamides; polyamides, especially those deriving from aliphatic polyamines such as diethylenetriamine or triethylenetetramine, for example, and dimerized or trimerized fatty acids (e.g., Versamide® of dimerized linoleic acid); polysulfides, obtainable for example under the name THIOKOL®; aniline-formaldehydes; polyhydric phenols, examples being resorcinol, 2,2-bis(4-hydroxyphenyl)propane or phenol-formaldehyde resins (novolaks); polybasic carboxylic acids and their anhydrides, such as phthalic anhydride, tetrahydrophthalic anhydride, hexahydrophthalic anhydride, 4-methylhexahydrophthalic anhydride, 3,6-endomethylenetetrahydrophthalic anhydride, 4-methyl-3,6-endomethylene-4-tetrahydrophthalic anhydride (methylnadic anhydride), succinic anhydride, adipic anhydride, trimethyladipic anhydride, sebacic anhydride, maleic anhydride, dodecylsuccinic anhydride, pyromellitic dianhydride, trimellitic anhydride, benzophenonetetracarboxylic dianhydride, or mixtures of anhydrides. Amines and polyaminoamides are preferred curing agents.

The composition may also comprise accelerators or curing catalysts. Examples are as follows: tertiary amines or quaternary ammonium compounds, Mannich bases such as 2,4,6-tris(dimethylaminomethyl)phenol, benzyldimethylamine, 2-ethyl-4-methylimidazole, monophenols or polyphenols such as phenol and bisphenol A, salicylic acid, dicyandiamide, boron trifluoride and its complexes with organic compounds such as ethers and amines, examples being $BF_3$-monoethylamine and $BF_3$-acetoacetanilide, phosphoric acid, and triphenylphosphine. Tertiary amines, Mannich bases, and imidazoles are preferred.

The resin may further comprise tougheners, such as carboxyl-terminated polybutadienes, such as carboxyl-terminated polybutadiene-acrylonitrile copolymers, reactive liquid rubbers, prepared by reacting polyether diol isocyanates with diphenols or hydroxy-epoxide compounds, or core shell particles, and also thixotropic agents, based for example on a urea derivative in a nondiffusing carrier material. Advantageously this thixotropic agent comprises a blocked polyurethane prepolymer as carrier material. The preparation of such urea derivatives and carrier materials is described in detail in EP 1 152 019 A1.

2) Polyisocyanates and Polyol or Polyamine Curing agents
   Suitable systems are for example:
   Polyoxyalkylene polyols, also called polyether polyols, which are the polymerization product of ethylene oxide, 1,2-propylene oxide, 1,2- or 2,3-butylene oxide, tetrahydrofuran or mixtures thereof, optionally polymerized by means of a starter molecule having two or three active hydrogen atoms such as, for example, water or compounds having two or three OH groups. Use may be made not only of polyoxyalkylene polyols which have a low degree of unsaturation (measured in accordance with ASTM D-2849-69 and expressed in milliequivalents of unsaturation per gram of polyol (meq/g)), prepared for example with the aid of what are known as double metal cyanide complex catalysts (DMC catalysts), but also of polyoxyalkylene polyols having a high degree of unsaturation, prepared for example with the aid of anionic catalysts such as NaOH, KOH or alkali metal alkoxides.
   Especially suitable are polyoxypropylene diols and triols having a degree of unsaturation of less than 0.02 meq/g and having a molecular weight in the range from 1000 to 30 000 g/mol, polyoxybutylene diols and triols, polyoxypropylene diols and triols having a molecular weight of 400 to 8000 g/mol, and also what are called "EO-endcapped" (ethylene oxide-endcapped) polyoxypropylene diols or triols. The latter are special polyoxypropylene-polyoxyethylene polyols which are obtained, for example, by alkoxylating pure polyoxypropylene polyols with ethylene oxide after the end of the polypropoxylation, and which consequently contain primary hydroxyl groups.
   Polyhydroxy-terminated polybutadiene polyols, such as, for example, those prepared by polymerizing 1,3-butadiene and allyl alcohol;
   Styrene-acrylonitrile-grafted polyether polyols, of the kind supplied, for example, by Bayer under the name Lupranol;
   Polyhydroxy-terminated acrylonitrile/polybutadiene copolymers, of the kind preparable, for example, from carboxyl-terminated acrylonitrile/polybutadiene copolymers (available commercially under the name Hycar® CTBN from Hanse Chemie) and epoxides or from amino alcohols;
   Polyester polyols, prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the aforementioned alcohols with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid or mixtures of the aforementioned acids, and also polyester polyols from lactones such as ε-caprolactone, for example;
   Polycarbonate polyols of the kind obtainable by reacting, for example, the abovementioned alcohols—those used for constructing the polyester polyols—with dialkyl carbonates, diaryl carbonates or phosgene.

The isocyanate-reactive polymers of difunctional or higher polyfunctional polyols having OH equivalent weights of 600 to 6000 g/OH equivalent, more particularly of 600 to 4000 g/OH equivalent, preferably 700 to 2200 g/OH equivalent, are advantageous. Additionally advantageous are the polyols selected from the group consisting of polyethylene glycols, polypropylene glycols, polyethylene glycol-polypropylene glycol block copolymers, polybutylene glycols, hydroxyl-terminated polybutadienes, hydroxyl-terminated polybutadiene-co-acrylonitriles, hydroxyl-terminated synthetic rubbers, and mixtures of these stated polyols.

As isocyanate-reactive polymers it is also possible, furthermore, to use difunctional or higher polyfunctional amine-terminated polyethylene ethers, polypropylene ethers, polybutylene ethers, polybutadienes, polybutadiene/acrylonitriles (e.g., Hycar® CTBN from Hanse Chemie), and also further amine-terminated synthetic rubbers or mixtures of the stated components.

It is additionally possible for isocyanate-reactive polymers to have been chain-extended as well, of the kind preparable in accordance with the person skilled in the art in a known way from the reaction of polyamines, polyols and polyisocyanates, more particularly from diamines, diols and diisocyanates.

Preferred isocyanate-reactive polymers are polyols having molecular weights between 600 and 6000 g/mol, selected from the group consisting of polyethylene glycols, polypropylene glycols, polyethylene glycol-polypropylene glycol block copolymers, polybutylene glycols, hydroxyl-terminated polybutadienes, hydroxyl-terminated polybutadiene-acrylonitrile copolymers, and mixtures thereof.

Particularly preferred isocyanate-reactive polymers are α,Ω-polyalkylene glycols having $C_2$-$C_6$ alkylene groups or having mixed $C_2$-$C_6$ alkylene groups which are terminated with amino groups, thiol groups or, preferably, hydroxyl groups. Particular preference is given to polypropylene glycol and polybutylene glycol.

Suitable polyisocyanates are diisocyanates, triisocyanates or tetraisocyanates, especially diisocyanates or triisocyanates. Diisocyanates are preferred. Suitable diisocyanates are aliphatic, cycloaliphatic, aromatic or araliphatic diisocyanates, especially commercial products such as methylenediphenyl diisocyanate (MDI), hexamethylene diisocyanate (HDI), toluene diisocyanate (TDI), tolidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}$MDI), p-phenylene diisocyanate (PPDI), m-tetramethylxylylene diisocyanate (TMXDI), and their dimers. Preference is given to HDI, IPDI, TMDI, MDI, and TDI.

Suitable triisocyanates are more particularly trimers or biurets of aliphatic, cycloaliphatic, aromatic or araliphatic diisocyanates, especially the isocyanurates and biurets of the diisocyanates described in the preceding paragraph.

Suitability is further possessed by surface-deactivated particles of solid polyisocyanates, of the kind described in R. Blum and H. Schupp, Progress in Organic Coatings (1990), pp. 275-288.

3) Acrylates and Methacrylates and Microencapsulated Free-Radical Initiators

Suitable systems are described in, for example, the application WO 02/070620 A1 and also the literature specified therein. They consist of methacrylic esters such as methyl methacrylate and tetrahydrofurfuryl methacrylate and also aliphatic polyurethane acrylates, elastomers reacted with acrylic acid, such as polybutadiene-acrylonitrile copolymers (trade name HYCAR® VTBNX) or core-shell polymers. Further suitable systems, composed essentially of mixtures of methacrylates with elastomers, are described in U.S. Pat. Nos. 3,890,407, 4,106,971, and 4,263,419, for example. Particularly suitable initiators are organic peroxides, especially benzoyl peroxide in combination with catalysts such as tertiary amines and/or complexes or salts of transition metals. Examples of tertiary amines are N,N-dimethylbenzylamine and N-alkylmorpholine. Examples of complexes or salts of transition metals are complexes or salts of nickel, cobalt, and copper.

The preparation of microencapsulated free-radical initiators such as peroxides are described for example in EP 0 730 493 B1.

Figure 3A:
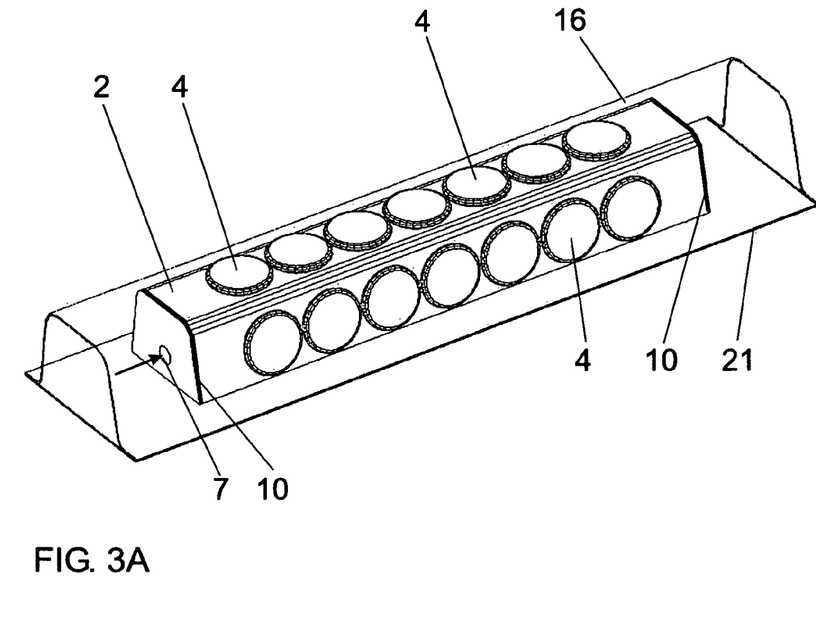
FIG. 3A shows a plan view of an inventive reinforcing element.
Figure 3B:
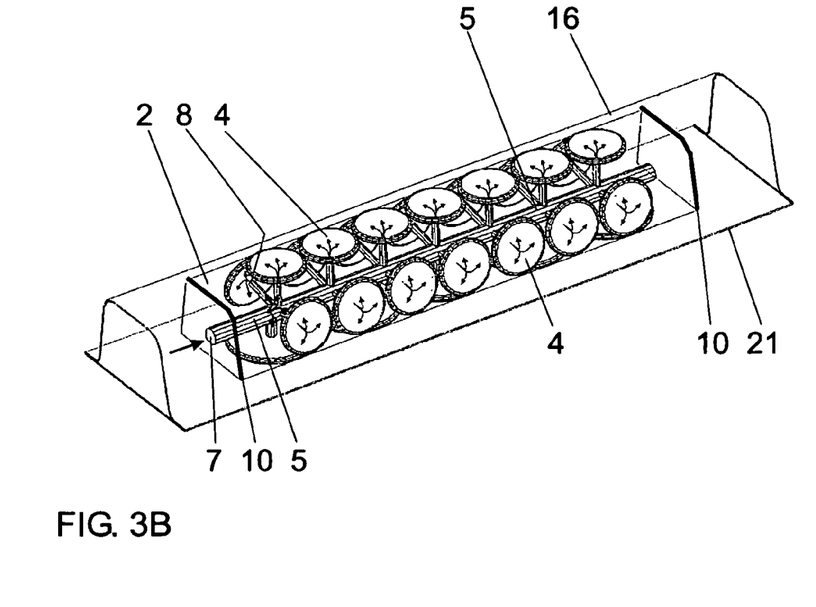
FIG. 3B shows a plan view of the inventive reinforcing element from FIG. 3A, with depiction of the internal channels.

In FIGS. 3A and 3B an inventive carrier element 2 is disposed in a column 21 of a vehicle body. The carrier element has channels 5 which can be filled with adhesive 4 via a filling opening 7. The channels 5 are outwardly open to the bodywork via openings 8 on the surface of the carrier element, and so in these regions the adhesive 4 emerges from the carrier element 2. In these regions the adhesive fills out the cavity 16 between carrier element and bodywork, and so connects the carrier element to the bodywork. In the figures the adhesive is shown only in the initial phase on emergence from the openings 8; if more adhesive is introduced, the adhesive becomes joined up to form a homogeneous area. In the end region of the carrier element 2 it is possible to dispose a seal 10. This seal may be the carrier element itself, by virtue of said part being specifically shaped in this region, so that there is virtually no distance from the bodywork; it can be a seal of plastic of the kind typically used for sealing, such as, for example, an elastic material, a strip of a foamable material, etc. By this means it is also possible for adhesives having a low viscosity to be used for bonding the carrier element in the body. Foamable materials which can be used are those described in connection with FIG. 1.

Figure 4:
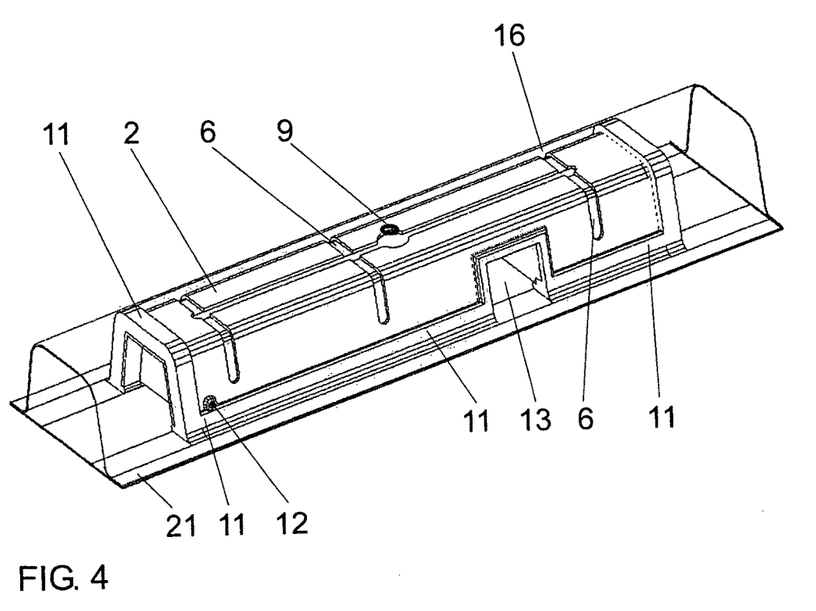
FIG. 4 shows a plan view of a further inventive reinforcing element.

FIG. 4 depicts a further inventive carrier element 2. In this embodiment the carrier element has channels 6 which are disposed on or in the region of the surface of the carrier element. These channels may have different distances from the bodywork. Via a filling opening 9, which in this case is disposed in the bodywork in the region of the channels of the carrier element 2, it is possible for adhesive 4 to be filled into the cavity 16 between bodywork and carrier element. The adhesive becomes distributed in the region of the channels 6 and in the regions which are at a distance from the bodywork. In the end region of the carrier element 2 it is possible here as well to dispose a seal 11. This seal may be the carrier element itself, by virtue of said part being specifically shaped in this region, so that there is virtually no distance from the bodywork; it can be a seal of plastic of the kind typically used for sealing, such as, for example, an elastic material, a strip of a foamable material, a puttylike material, etc.

Puttylike materials used may be materials as described above for the reactive adhesive, but also those which do not cure. The puttylike material is prepared preferably on the basis of polyurethane, epoxide, epoxide-polyurethane hybrid, synthetic rubber, PVC, etc., and is formulated so that it adheres well to surfaces of plastic and also to surfaces of metal, especially to steel surfaces and to aluminum surfaces, which, moreover, may have been surface-treated. The puttylike material preferably adheres well to oiled steel, in order to prevent corrosion in the region between steel and seal. Preferably, however, the puttylike material used is an adhesive as described above for the reactive adhesive. The material may have, moreover, a low expansivity of, for example, 10-100%, preferably 10-50%, in order to ensure correct extrusion of the strand and sealing. It is also possible to use combinations of above-described foamable materials and puttylike materials.

The material may be applied as a continuous strand by hand or in automated form by means of a robot. The strand is preferably applied to the carrier element when the body is being assembled, shortly before the cavity is closed and the parts are welded. Alternatively the puttylike material may be applied to the bodywork, i.e., for example, to the steel sheet, and the carrier element may only then be inserted. When the bodywork parts are joined, the strand is pressed between carrier element and bodywork and in this way the seal is produced. The puttylike material may then cure in the subsequent operating steps as described below. The seal, however, is also obtained without curing of the puttylike material, and so the adhesive can be introduced into the cavity between bodywork and carrier element even before the bodywork is coated, and the adhesive is cured in the baking operation for the coating. The puttylike material preferably has a low to moderate viscosity of 100-1500 Pas at a temperature of 40-60° C., in order to facilitate processing and to ensure correct extrusion when the bodywork and the carrier element are assembled. At room temperature in the range of 10-30° C., the viscosity ought preferably to be moderate to high and to be situated within a range of 500-5000 Pas. This is in order to obtain correct sealing and to ensure that adhesive injected does not emerge through the seal or that the adhesive is not leached out when the bodywork is coated. In the baking operation for the coating of the bodywork, the puttylike material ought to retain its properties.

Foamable materials which can be used are those described in connection with FIG. 1. Depicted in the figure is a foamable material as seal 11. In the baking operation after coating of the bodywork, this material forms a foam and seals off the interior space between carrier element and bodywork that is defined by the channels 6. As a result, adhesives with a low viscosity can also be used to bond the carrier element in the bodywork. In the bodywork it is possible for an exit opening 12 to be disposed. This helps determine, in a simple way, when sufficient adhesive has been introduced into the interspace, by observation as to when adhesive emerges from the opening 12. This opening is therefore disposed in the most remote region, which becomes filled with adhesive last.

In the carrier element 2 it is also possible for there to be cavities 13 or passages, etc., disposed. These regions are likewise sealed off by means of the seal 11, and so no adhesive can emerge in these regions. It is likewise possible for certain regions of the carrier element to be provided with a seal such that within these regions there is no adhesive present. In this way it is possible to produce regions in which there is no connection between carrier element and bodywork, with the consequence that there is no reinforcement there.

Figure 5:
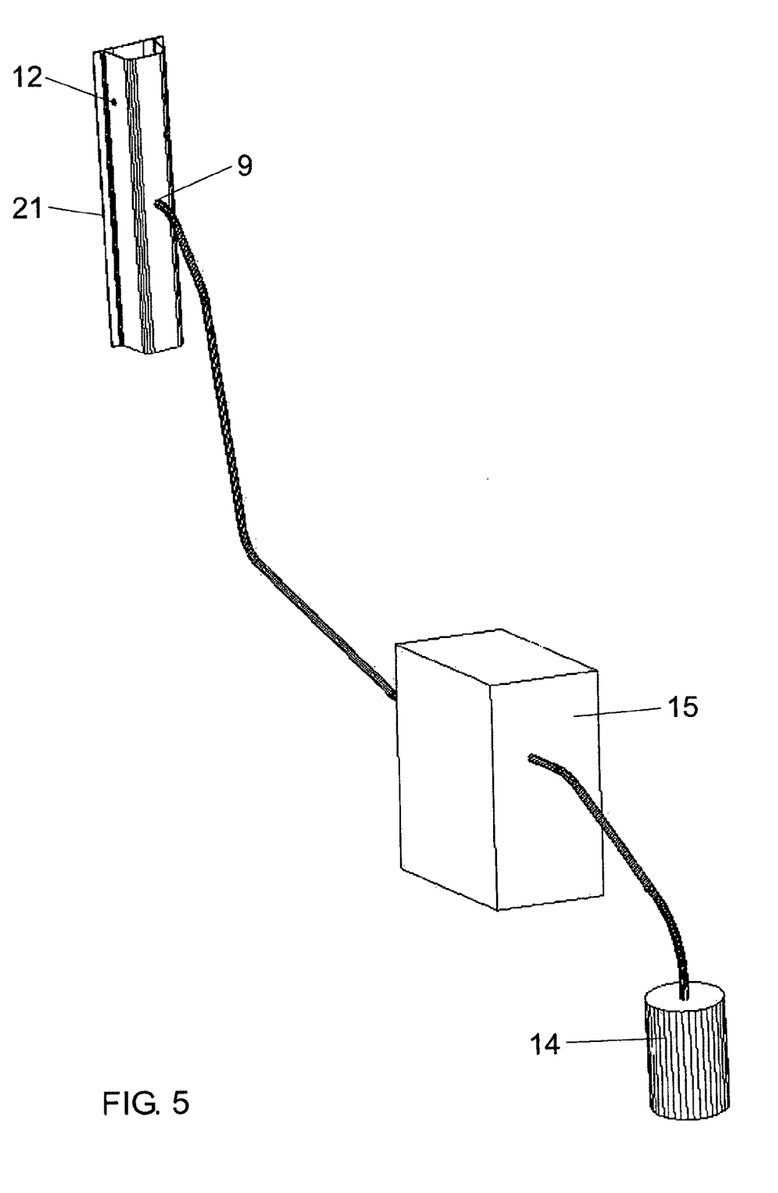
FIG. 5 shows a diagrammatic representation of the adhesive fill operation.

FIG. 5 depicts in diagrammatic form the operation of adhesive filling. The adhesive is introduced from an adhesive container 14 by means of a pump 15 and the fill opening 9 into the interspace 16 between carrier element and bodywork.

The method of installing the reinforcing element proceeds typically as follows. The carrier element is supplied to the site of production of the bodywork. The carrier element is inserted or placed into the cavity that is to be reinforced, this insertion or placement taking place either by hand or by means of a robot. The carrier element is fixed in the cavity—this can be done arbitrarily, by means for example of mounting elements on the carrier element, mounting elements on the bodywork, adhesive, etc. The cavity is sealed if necessary and the bodywork is welded or bonded or both. The body enters a deposition bath and is coated. This is followed by a baking operation for these coatings, and, if need be, foamable seals disposed on the carrier element foam up in the course of this operating step. Thereafter, as described above, the adhesive is introduced into the cavity between bodywork and carrier element. This takes place, for example, via an opening 9 in the bodywork, directly via an opening 7, if need be via a hose which is placed in the body and is connected to the opening 7. Correct filling with adhesive is monitored via an exit opening 12, and/or via the fill pressure, and/or via the fill volume. When a particular fill volume of adhesive has been introduced, another material, air for example, or a material cheaper than the adhesive, can be introduced into the filling system in order to press the adhesive that has remained in the channels into the interspace 16 between carrier element and bodywork. By this means the channels are free from the adhesive, in order on the one hand to save on adhesive and on the other hand to allow subsequent filling. Depending on the design of the carrier element and/or of the channels, the flow of adhesive can be adjusted so that, locally, more adhesive and hence better reinforcement takes place, according to where this is necessary.

Alternatively the adhesive can be introduced before the bodywork is coated. This allows the adhesion between carrier element and bodywork to be improved, since in this case bonding takes place not to the coating but instead directly to the bodywork. In that case, however, the carrier element must additionally have outflow channels, to allow the coating material to flow through the carrier element in the coating operation. These outflow channels may be independent of the channels for introducing the adhesive.

The invention is, it will be appreciated, not confined to the working example described and shown. All cavity structures, i.e., all structural elements with cavities, can be reinforced using the systems described above. The channels on the carrier element are arbitrarily exchangeable, i.e., it is also possible for channels in the carrier element to be mixed with channels on the carrier element.

LIST OF REFERENCE SYMBOLS

1 Reinforcing element
2 Carrier element
3 Distance
4 Adhesive
5 Channel
6 Channel
7 Filling opening
8 Exit opening
9 Filling opening
10 Seal
11 Seal
12 Exit opening
13 Cavity/passage
14 Adhesive container
15 Pump
16 Cavity/interspace
20 Reinforcing element
21 Vehicle structure/bodywork
22 Carrier element
23 Foamable material
24 Thickness unfoamed
25 Distance from bodywork
26 Thickness foamed

The invention claimed is:

1. A method of reinforcing a cavity of a structural element, a carrier element being connected to the structural element in the structural element for reinforcement purposes, the method comprising:
    disposing a carrier element in the structural element, the carrier element having channels,
    after the carrier element is disposed in the structural element, introducing an adhesive into the cavity between the carrier element and the structural element by means of these channels, wherein the channels consist of grooves arranged in the surface of the carrier element or inside the carrier element, and the cavity consists of a space between an outer surface of the carrier element and an inner surface of the structural element, not including the channels, and
    after introducing the adhesive, pressing the adhesive into the cavity between the carrier element and the structural element with a second material introduced into the cavity by means of the channels.

2. The method of claim 1, wherein the adhesive is introduced before or after coating of the structural element.

3. The method of claim 1, wherein the fill level of the cavity between the carrier element and the structural element with adhesive is monitored by at least one of means of a special opening, said opening being disposed in the most remote region of said carrier element which becomes filled with adhesive last; means of the fill pressure of the adhesive; and means of the fill volume of the adhesive.

4. The method of claim 1, wherein adhesive disposed at least partly in the channels is expressed by means of air or by means of another material.

5. The method of reinforcing a cavity of a structural element according to claim 1, wherein the channels of the carrier element are disposed in and/or on the carrier element.

6. The method of reinforcing a cavity of a structural element according to claim 1, wherein at least one seal is disposed on the carrier element.

7. The method of reinforcing a cavity of a structural element according to claim 1, wherein on the structural element an opening is arranged by means of which the adhesive can be introduced.

8. The method of reinforcing a cavity of a structural element according to claim 1, wherein on the structural element an opening is arranged by means of which the fill level of the adhesive can be read off.

9. The method of reinforcing a cavity of a structural element according to claim 1, wherein the adhesive is a one-component reactive adhesive.

10. The method of reinforcing a cavity of a structural element according to claim 1, wherein the adhesive is a two-component reactive adhesive.

11. The method of reinforcing a cavity of a structural element according to claim 1, wherein the structural element is a vehicle structure.

12. The method of reinforcing a cavity of a structural element according to claim 1, wherein the second material is air.

13. A method of reinforcing a cavity of a structural element, a carrier element being connected to the structural element in the structural element for reinforcement purposes, the method comprising:

disposing a carrier element in the structural element, the carrier element having channels, after the carrier element is disposed in the structural element, introducing an adhesive into the cavity between the carrier element and the structural element by means of these channels, wherein the channels consist of grooves arranged in the surface of the carrier element or inside the carrier element, and the cavity consists of a space between an outer surface of the carrier element and an inner surface of the structural element, not including the channels, and monitoring the fill level of the cavity between the carrier element and the structural element with adhesive by means of a special opening disposed in the most remote region of said carrier element which becomes filled with adhesive last.

14. The method of reinforcing a cavity of a structural element according to claim 1, wherein the adhesive on curing exhibits an expansion of 0 to 5%.

\* \* \* \* \*